May 31, 1960  G. H. COOKE  2,938,611
ANTICREEP AND HILL HOLDER BRAKE SYSTEM
Filed March 15, 1956  2 Sheets-Sheet 1
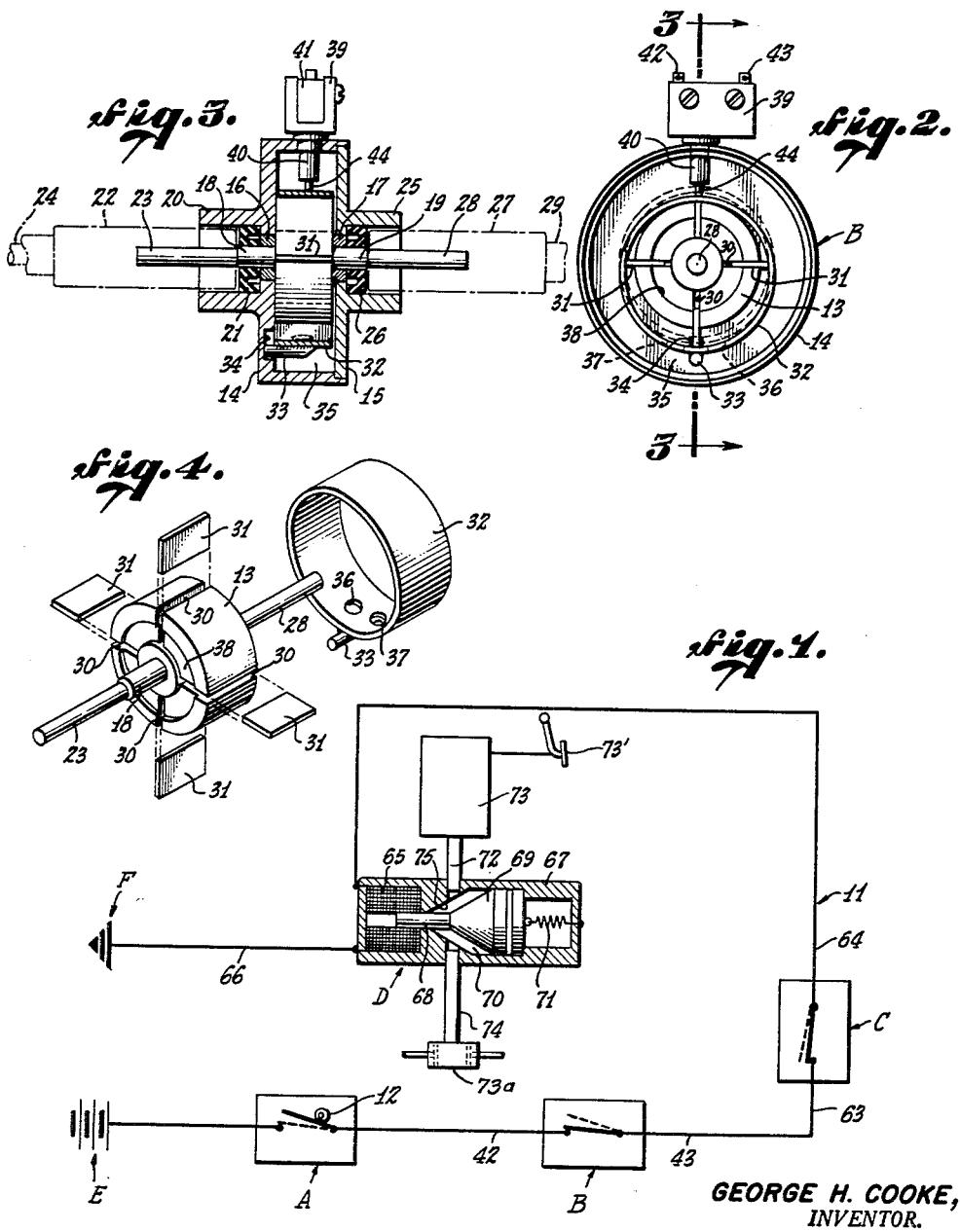
GEORGE H. COOKE,
INVENTOR.
BY R. E. Jeanque
ATTORNEY.

May 31, 1960 G. H. COOKE 2,938,611
ANTICREEP AND HILL HOLDER BRAKE SYSTEM
Filed March 15, 1956 2 Sheets-Sheet 2
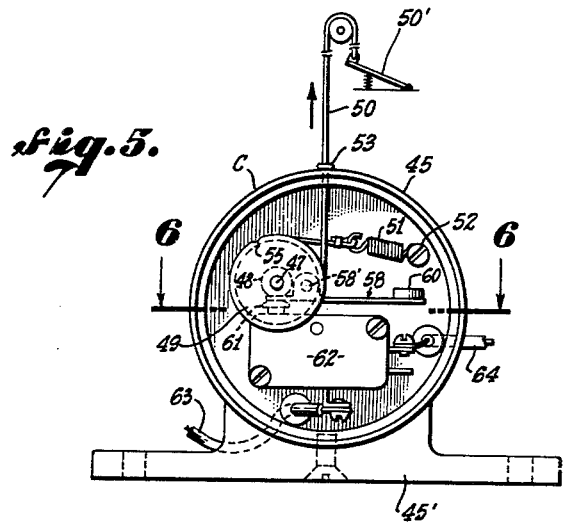
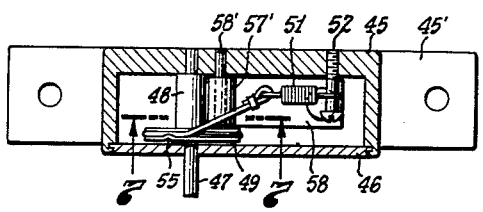
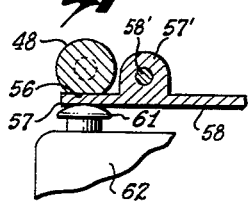 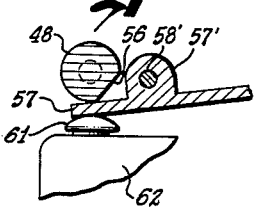 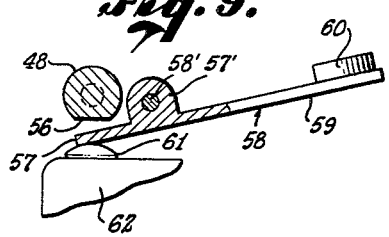
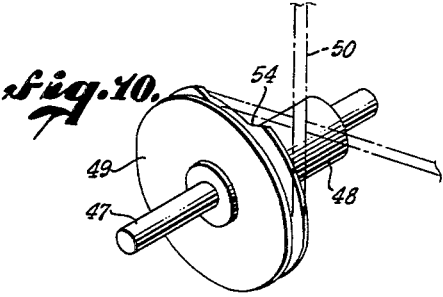
GEORGE H. COOKE,
INVENTOR.
BY *R. E. Geangue*
ATTORNEY

United States Patent Office 2,938,611
Patented May 31, 1960

2,938,611

ANTICREEP AND HILL HOLDER BRAKE SYSTEM

George H. Cooke, 10866 White Oak, Granada Hills, Calif.

Filed Mar. 15, 1956, Ser. No. 571,656

14 Claims. (Cl. 192—3)

This invention relates to an anti creep and hill holder brake system and more particularly to a brake system which prevents the creeping or rolling of automobiles equipped with either automatic fluid transmissions or friction clutches.

Presently known types of anti creep or anti roll systems incorporate a circuit having a number of switches, with one switch being operated by the ignition key, another by the accelerator pedal and another by the movement of the vehicle. Because of the slow actuation provided for these switches, present systems do not operate satisfactorily since the systems do not respond properly to the actions of the driver and interfere with the actions of the driver. Also, in present systems the car wheels are held while the car is in a skid and after the brakes have been applied and the only manner in which the brakes can be released is to depress the accelerator pedal which, of course, is a highly undesirable operation under such conditions.

The present invention overcomes the disadvantages of prior systems in that an inertia mass is utilized in the circuit to prevent holding of the wheels while the vehicle is being decelerated at or above a predetermined rate so that no automatic braking can result in a skid while the wheels of the vehicle are not turning. Further, the present invention utilizes three separate switch constructions which are instantaneously responsive to movement of the ignition key, of the accelerator pedal and of the wheels so that the brake system always operates correctly and does not interfere with the driving of the automobile. In this form of the invention, the inertia mass can be carried by the switch arm of the accelerator operated switch so that the operation of the switch by the accelerator pedal can be overridden by the force of the inertia mass at or above a given deceleration. However, the inertia mass could separately control a fourth switch or could be incorporated in the ignition operated or wheel operated switches. The switch which is responsive to wheel movement is in the form of a positive displacement pump having slidable vanes surrounded by a switch actuating ring. Upon movement of the wheels, the ring is immediately centered about the vanes and this centering movement results in quick actuation of the switch responsive to the turning of the wheels. Since the switch does not depend upon centrifugal force, it can be of light construction and will withstand high rotative speeds. Thus, there is no delay in the action of the anti creep system and the system can be utilized for automobiles having the usual types of friction or fluid transmission without the driver being aware of the incorporation of the system. The present invention serves to hold the wheels and prevent the creeping, either forwardly or rearwardly, which results with fluid transmission after the automobile has been stopped and the engine is idling with the accelerator pedal lifted. Also, the present system is effective as a hill holder regardless of the type of clutch or transmission utilized since, after the vehicle is stopped on a steep incline or decline and the accelerator pedal has been lifted, the wheels are positively held with sufficient force to prevent the vehicle from rolling either forwardly or backwardly. However, the anti creep brake system of this invention does not replace the emergency brake since the hill holding action is only effective while the ignition switch is on. In other words, it is not deemed desirable to have the operator rely upon the hill holder feature when parking the vehicle on a steep grade. Thus, by the present invention, a novel anti creep and hill holder brake system is provided which prevents the creeping or rolling of the vehicle after the vehicle has been stopped, either on level ground or on a grade, by normal use of the brake pedal. The pressure applied by the foot brake can be held on the wheels by actuation of valve means in the brake system after the car is stopped and the accelerator pedal is lifted. Thereafter, the holding pressure is automatically released upon depression of the accelerator pedal. However, it is understood that wheels can be held by other means responsive to the switches and that both the wheel operated switch and the accelerator operated switch, incorporating the inertia mass, have general utility as switches.

It is therefore an object of the present invention to provide an anti creep and hill holder brake system which is effective to hold an automobile, without the use of a manual brake, against creeping or rolling after the car has been stopped on substantially level ground and against rolling forwardly or rearwardly after the automobile has been stopped on an incline or decline.

Another object of the present invention is to provide an anti creep and hill holder brake system which comprises switches in series with one switch being operated by the ignition key, another by the accelerator pedal and another in response to vehicle movement, the switches being highly responsive so that the system does not interfere with the normal operation of the vehicle with the accelerator pedal and foot brake.

Another object of the present invention is to provide an anti creep and hill holder brake system which is responsive to deceleration of the automobile so that the brakes of the automobile can not be positively locked during the time that the vehicle is in a skid with the wheels stopped and the accelerator pedal lifted.

A still further object of the invention is to provide a simple and economical anti creep and hill holder brake system which can be quickly applied to automobiles with either friction or fluid coupling to the wheels and which can be utilized in connection with all types of automatic fluid transmissions, which tend to make the automobile creep when the car is idling and permits the car to roll on a grade.

Another object of the invention is to provide a novel switch actuating mechanism which is responsive to the rotation of a shaft to provide a positive pump pressure for actuation of the switch.

Another object of the invention is to provide a novel switch mechanism which is responsive to control movement and which incorporates an inertia mass to override the control movement when the mounting for the switch changes speed at or above a given rate.

These and other objects of the invention not specifically set forth above will become readily apparent from the accompanying description and drawings in which:

Figure 1 is a schematic wiring diagram for the various switches of the anti creep and hill holder brake system and illustrating the construction of the solenoid valve operated by the circuit of the system.

Figure 2 is a side elevational view, with one side of the casing removed, illustrating two positions of the switch which is connected with the speedometer cable of the automobile to be responsive to turning of the wheels.

Figure 3 is a vertical transverse section along line 3—3 of Figure 2 illustrating the manner in which the switch is connected in the speedometer cable drive.

Figure 4 is an expanded perspective view of the pump vanes and the actuation ring of the switch responsive to wheel turning.

Figure 5 is a side elevational view, with the side of the casing removed, of the accelerator operated switch and illustrating the actuator cable attached to the accelerator pedal.

Figure 6 is a horizontal section along line 6—6 of Figure 5 illustrating the spring which holds the switch in closed position when the accelerator pedal is not depressed.

Figure 7 is a partial vertical section along line 7—7 of Figure 6 showing the switch in closed position and illustrating the relative positions of the switch cam and switch arm when the accelerator pedal is lifted and the vehicle is experiencing low deceleration.

Figure 8 is a partial section similar to that of Figure 7 illustrating the positions of the switch cam and switch arm after the switch has been opened by movement of the cam upon depression of the accelerator pedal.

Figure 9 is a partial section similar to that of Figure 7 showing the switch in open position while the accelerator pedal is lifted and the vehicle is being decelerated at or above a given rate so that the inertia mass on the switch arm prevents the closing of the switch.

Figure 10 is a perspective view of the cam mechanism connected with a cord attached to the accelerator pedal so that movement of the pedal will actuate the switch.

Referring to Figure 1, the switches A, B, C, and the solenoid valve D are located in circuit 11 and are connected in series between a power source E, such as the battery of the car, and ground F on the car. The full line position of each of the switches represents the normal position of each switch when the motor of the automobile is turned off and the vehicle is standing still, while the dotted line position of each switch represents the condition in which the ignition is turned on and the automobile is moving with the accelerator pedal depressed. The switch A is closed by movement of the ignition key to turn on the engine and a cam 12 can be used to transmit the movement of the key to switch A. The switch C is moved to open position by depressing the accelerator pedal and switch B is moved to open position upon rotation of the wheels of the automobile. It is apparent that when any one of these switches are open, the solenoid operated valve D will not be energized by the circuit.

The construction of switch B, which is responsive to the movement of the automobile and to rotation of the wheels, is illustrated in Figures 2-4. The switch comprises a positive displacement pump having a rotor 13 contained in a casing 14 which is closed to be fluid tight by cover member 15. The casing 14 and cover 15 contains bearings 16 and 17, respectively, for supporting the shafts 18 and 19, respectively, for the rotor 13. Casing 14 has a circular extension 20 which contains a neoprene gland 21 for sealing the bearing 16 against leakage of fluid from the casing 14. This extension also receives the coupling 22 for connecting the extension 23 of shaft 18 with the cable 24 leading to the speedometer of the automobile. In a like manner, the cover member 15 has an extension 25 which receives a neoprene gland 26 for sealing the bearing 17 against leakage of fluid from the casing 14 and the extension 25 also receives coupling 27 which serves to connect extension 28 of shaft 19 with the speedometer cable 29 leading to the drive shaft. The rotor 13 contains four radial grooves 30, each of which loosely receive a vane 31. The depth of each groove is just sufficient to completely receive the entire vane so that the vanes, when fully inserted into the rotor, would not interrupt the circumference of the rotor. The rotor 13 and the vanes 31 are surrounded by a rotor ring 32 which is substantially larger in diameter than the rotor 13 and normally hangs downwardly and bears against the rotor, as illustrated in the full line position of Figure 2. A pin 33 is welded or otherwise secured to the bottom of the ring 32 and this pin is received in slot 34 of casing 14 to permit the ring to move bodily with respect to the rotor while preventing rotational movement of the ring. The lower portion 35 of the casing 14 serves as a fluid sump and openings 36 and 37 in ring 32, on opposite sides of pin 33, permit the fluid to be drawn into the ring 32 upon the rotation of the vanes 31 past the openings. While the rotor 13, vanes 31 and the rotor ring 32 are substantially the same width as the interior of the casing, a small clearance does exist at the sides of the casing to permit fluid to leak back to sump 35 past the rotor and rotor ring and past the rotor into a groove 38 on each side of the rotor. Also, fluid can leak through grooves 30 past vanes 31 towards the center of the rotor and into side grooves 38. The purpose of permitting leakage will be described in connection with the operation of switch B.

A U-shaped frame 39 has an extension 40 secured in the top of casing 14 and the frame 39 supports a microswitch 41 having leads 42 and 43. Extension 40 slidably receives push pin 44 of the switch, and the pin is spring biased in a direction to engage the rotor ring 32. When the rotor ring 32 is in the full line position illustrated in Figure 2, the push pin is completely extended and the switch 40 is closed. Prior to the rotation of the rotor 13 upon movement of the vehicle, the vanes 31 can be in the position illustrated in Figure 2, wherein the lower vanes fall outward to contact the rotor ring 32 and the upper vane is completely contained within its groove 30. However, it is understood that the vanes can be in other positions when the rotor is stationary and the rotor will be held in down position by the spring action on the push pin 44. Upon rotation of the rotor, the vanes 31 will move outwardly under centrifugal force and under the force of gravity as each vane moves downwardly so that all the vanes will engage the ring.

In operation, switch B is in its full line position of Figure 2 and is closed when the vehicle is stationary. Upon rotation of the rotor simultaneously with movement of the vehicle, each vane will draw fluid from sump 35 into the space between successive vanes as it moves past the openings 36 and 37 and further rotation of the vane will carry this fluid around towards the top of the rotor. As each successive vane passes the openings 36 and 37, additional fluid will be trapped between the rotor and the rotor ring and will move upwardly around the rotor. After about three-quarters of a rotation of the rotor, the rotor ring will become centered about the axis of the rotor 13, as illustrated by the dashed line position of Figure 2 and the upward movement of the ring will move push pin 44 in order to open switch B. The ring 32 will become filled with fluid drawn from the sump 35 and the fluid will leak past the rotor into the grooves 38 on each side of the rotor. From groove 38, the fluid will flow underneath the vanes 31 to hold these vanes outwardly in engagement with the rotor ring. Also, some fluid can leak past the ring 32 to the sump and thus, the only pumping action that will result from continued rotation of the vanes will be that necessary to replace fluid which has leaked back to the sump. As the rotor ring 32 is centered, it moves bodily upwardly by the movement of pin 33 in slot 34 and the pin 33 prevents rotation of the ring. Since the vanes 31 can be very light, the vanes can be rotated at very high speeds during high speeds of the vehicle without failing under stresses developed by centrifugal force. Because of the positive action of this switch, any slight movement of the car will serve to open the switch 41 and the time lag, encountered in centrifugal switches because of inertia, will not be present. Therefore, switch B overcomes the disadvantages of centrifugal switches since it is quick acting and will not fly apart at high speed in the same manner as centrifugal switches which are made sensitive enough to detect very low speeds. The switch 41 will immediately return to closed position once the automobile is stopped since the oil can drain from between the rotor and the rotor ring to the sump 35 and this drainage will be quickly accomplished because of the spring pressure exerted on ring 32 by the push pin 44. Thus, the switch B is capable of quickly sensing whether or not the vehicle is moving and so long as the vehicle is moving, switch B will interrupt the circuit 11. It is also understood that the switch B and its operating mechanism can be used in a variety of applications where a positive, quick action switch is required to sense movement of an element which varies over a wide range of speed.

The construction of accelerator operated switch C is illustrated in Figures 5–10, and the switch is contained in a casing 45, which is secured to a base 45' carried by the vehicle and has a cover plate 46. Casing 45 and cover plate 46 support a shaft 47 which carries a cam 48 and a pulley wheel 49. Pulley wheel 49 has a circumferential groove for receiving a cord 50 which extends through an opening in the casing 45 and is connected with the accelerator pedal 50' of the vehicle. The other end of the cord 50 is connected to a spring 51 which is secured to a screw 52 attached to the casing. The cord 50 carries a stop 53 exteriorly of the casing so that the pressure of spring 51 is always present on the cord 50 to pull the stop 53 against the casing when the accelerator pedal is lifted. When the accelerator pedal is depressed, the cord 50 is pulled out of the casing in order to rotate the pulley wheel 49 against the force of the spring 51. The pulley wheel has a cut-out portion 54 which permits the cord to extend sidewise of the pulley to connect with the spring and the cord is firmly attached to the pulley at a position 55 by deforming the rim of the pulley so that large movements of the accelerator pedal will not result in excessive extension of the spring 51. The rotation of the pulley 49 will, in turn, cause rotation of the cam member 48 which, when the accelerator pedal is not depressed, has a flat surface 56 positioned opposite end 57 of switch arm 58 (see Figure 7). An enlargement 57' is carried by the switch arm 58 to receive mounting shaft 58' which serves to pivotally mount the switch arm in the casing. The opposite end 59 of switch arm 58 carries an inertia mass 60 so that the mass is positioned on the opposite side of shaft 58' from cam member 48.

In operation, switch C is closed when the accelerator pedal is lifted and the vehicle is not moving. Under such conditions, the spring biased push pin 61 of microswitch 62 forces end 57 against the flat surface 56 (see Figure 7). When the mounting vehicle starts to move in the direction of the arrow in Figure 5, the depression of the accelerator pedal will cause rotation of the cam member 48 and movement of the end 57 of the switch arm against push pin 61 in order to open the microswitch 62 (see Figure 8). When the accelerator pedal is released, the flat surface 56 of the cam member will return to a position opposite end 57 of the switch arm and the spring of the microswitch acting against the push pin 61 will cause the end 57 to move upwardly against the flat surface 56 and close the switch (see Figure 7). The weight of the inertia mass 60 is so selected that it will move forward against the spring force on the push pin 61 when the vehicle is being decelerated at or above a given rate. Thus, even though the accelerator pedal is lifted and flat surface 56 of the cam member is opposite the end 57 of the switch arm, the inertia mass 60 is capable of depressing the push pin 61 and opening the switch if the rate of deceleration is at or exceeds the selected value (see Figure 9). If the foot brake of the vehicle is applied while the accelerator pedal is lifted and the wheels are stopped and placed in a skid at a deceleration rate at or above the selected value, the mass 60 will hold the push pin of switch C in open position so that the circuit 11 of Figure 1 will not be operative to energize the solenoid valve D. Therefore, under such conditions, it is not necessary to actuate the accelerator pedal in order to release the brake, and it is obvious that actuation of the pedal under such conditions, as required in prior systems, would be very dangerous. The actuation resulting from the inertia mass 60 will be further described in connection with the operation of the complete brake system. It is apparent that the operation of switch C can be utilized generally in switches which require an override of the control movement under selected conditions of deceleration or acceleration.

The microswitch 62 is connected between leads 63 and 64 which form a part of the circuit 11 and lead 64 connects with the winding 65 of the solenoid valve D which, in turn, is connected with ground F through line 66. Winding 65 is contained within casing 67 of the solenoid valve and contains a center opening for receiving an armature 68 which is connected to a valve 69. The valve 69 is movable within space 70 of the casing and is normally biased to open position by means of spring 71. The space 70 is connected by passage 72 with the master brake cylinder 73 which is operated by foot pedal 73' to control the pressure applied to the individual brake cylinders (such as cylinder 73a) through passage 74 to slow the speed of the vehicle. It is therefore apparent that when the switches A, B and C of the circuit are closed, the solenoid winding 65 will be energized to move the armature 68 into winding 65 and pull the valve 69 against seat 75 in order to close the connection through the space 70 between passages 72 and 74. Thus, if the individual brake cylinders have been supplied with pressure from master cylinder 73 to stop the vehicle, the closing of the valve 69 will lock this pressure on the individual brake cylinders and will hold the brakes in locked condition during the time that winding 65 is energized. Upon the opening of one or more of the switches A, B, C, the winding 65 will be deenergized and the valve 69 will be returned to its open position by spring 71 so that the foot brake system can again operate in its usual manner and independently of the anti creep and hill holder brake system.

The operation of the brake system will now be described in connection with the circuit shown in Figure 1. It will be understood that the particular designs of automatic fluid transmissions which can be used for the vehicle are not illustrated since the construction of such transmissions, which are continually coupled with the wheels even during idling, is well known. Also, the types of friction clutches and drives usable with the invention are well known and differ from fluid types in that a positive disengagement is obtained with the friction types when the clutch pedal is depressed to prevent creeping. During the time the vehicle is parked and not running, the ignition operated switch A will be open so that the solenoid valve D is deenergized even though the accelerator operated switch C and the movement sensitive switch B are closed. Thus, there is no pressure held on the brakes and it is necessary to rely upon the emergency brake of the automobile. This requirement is highly desirable since it conforms with normal parking procedures. After the ignition operated switch A has been closed by turning on the ignition key to start the engine, the switch A will be closed and the switch C will be opened when the accelerator pedal is actuated to start the vehicle in motion. Once the wheels start to turn, the switch B will also immediately open and it is thus seen that during normal driving of the car the switch A will be closed and the switches B and C will be open so that the winding 65 of the solenoid valve D is deenergized and the valve does not interfere with the normal actuation of the master cylinder 73. When it is desired to bring the car to a stop, the foot will be lifted off the accelerator pedal to close the switch C, but since the wheels are still turning, the switch B will remain open until a full stop is attained by actuation of the foot brake. Thus, the solenoid valve D will not interfere with the stopping operation of the car. Because of the fact that the switch B is sensitive to only slight movement of the wheels of the automobile, it is apparent that the solenoid valve D will not interfere with the brake pedal operation so long as any movement of the car exists and full use of the brake pedal is available until the vehicle is completely stopped. When the car is brought to a full stop, the switches A, B and C will all be closed since the accelerator will not be actuated and the wheels of the automobile will not be turning. Under such conditions the solenoid valve D will hold the pressure in line 74 which has resulted from the foot actuation of the brake system to bring the car to a stop. Thus, it is apparent that the car will be positively held against creeping or rolling by the brake system of the car and such action will result whether the car is on an incline or decline or is resting on level surface. Without the use of the present invention, the operator must continually hold the vehicle with the foot pedal while at a stop light or on a grade to prevent accidents, and the present invention prevents all such accidents by positively holding the car in its stopped position. When it is desired to again start the movement of the vehicle after a stop, the accelerator pedal is pressed and switch C will be simultaneously opened to deenergize the circuit 11 and return the valve 69 to its opened position to permit communication between the master cylinder and the brake line 74. Also, upon movement of the wheel, the switch B will be opened by the action of the vanes 31 on the ring 32 so that the car can be driven in the usual manner while it is moving without the operator being aware of the fact that the system of the present invention is incorporated in the braking system of the vehicle. As previously stated, the switch B overcomes the disadvantages of a centrifugal type of switch to sense movement of the vehicle in that centrifugal switches are slow acting and can not be made sensitive enough to be actuated by only slight movement of the car and still strong enough at higher speeds.

Referring now to the operation of the accelerator operated switch C, the inertia mass 60 serves the purpose of preventing the locking of the wheels when braking is not desired under skidding conditions. In normal operation, when the car is braked and the accelerator is deactuated, the mass 60 will serve to maintain the switch C open and since the wheels of the car are still turning, the switch B is also open until the car is stopped. At some selected low deceleration rate the spring of switch 62 working against the switch arm 58 will overcome the inertia force of mass 60 and the switch B will be wholly under control of the accelerator pedal. However, in certain conditions, such as when the wheels are held in a skid, the switch B will close because the wheels are not turning and at the same time the accelerator pedal will not be depressed. Thus, if it were not for the mass 60, the solenoid valve D would be actuated to lock the pressure on the brakes and release of the brakes could only be accomplished by actuation of the accelerator pedal which, of course, would be undesirable. However, by proper selection of the mass 60, the accelerator switch C can be held open by the mass 60 during the skidding of the wheels while the vehicle is decelerating at or above a predetermined rate and the operator will continue to have control of the car through the manual brake pedal under such conditions. The mass 60 serves to overcome the disadvantages that are inherent in prior systems which do not give the operator control of the car during skidding of the wheels except through actuating the accelerator pedal which, of course, is very dangerous under such conditions. It should be pointed out that the mass 60 is of such weight that it will not operate to open the accelerator switch C when the car is positioned on a steep decline.

It is apparent that as long as the motor switch A is closed, the system of the present invention operates both as an anti creep device and as a hill holder. The system provided by the present invention is quick acting so that the operator of the automobile is not aware of the fact that the system is in operation and because of the manner in which the switches B and C operate, the switches are very sensitive to their controlling conditions. It is contemplated that various braking means can be operated by the present invention in place of the solenoid valve which controls fluid pressure and various switch constructions and circuits can also be used. Also, as previously stated, the switches B and C have general utility. Various other modifications are contemplated and may be readily resorted to by those skilled in the art without departing from the spirit and scope of the invention as hereinafter defined by the appended claims.

What is claimed is:

1. A brake system for preventing movement of a vehicle after the vehicle has been stopped and the engine is running, comprising an accelerator for said vehicle, brake means for stopping movement of the vehicle wheels, means for applying said brake means in order to bring said vehicle to a stop, automatic means for controlling said brake means to continually apply said brake means after the vehicle is stopped with the vehicle accelerator unactuated, control means connected with said automatic means and comprising a circuit containing a first switch means responsive to accelerator position and a second switch means responsive to rotation of the vehicle wheels, said second switch means being actuated by movable means located within a casing and surrounding a rotor driven in response to vehicle wheel movement, said surrounding means being positioned eccentrically of said rotor while said vehicle is stopped, a source of fluid in communication with said surrounding means, said rotor containing a plurality of spaced, slidable vanes for trapping fluid within said surrounding means and thereby moving said surrounding means towards a concentric position with said rotor upon commencement of movement of said vehicle, the movement of said surrounding means providing quick response of said second switch means to movement of said vehicle so that the operation of said automatic means does not affect the normal operation of said brake means and said accelerator.

2. A brake system as defined in claim 1 wherein said surrounding means comprises a ring having fluid passage means at a single location only in communication with a source of fluid within said casing, and clearance space between said casing and said rotor for draining trapped fluid out of said ring so that said ring can return to its eccentric position when said vehicle is stopped.

3. A brake system as defined in claim 1 wherein said first switch means comprises a switch actuator connected with said accelerator to actuate said first switch means upon movement of said accelerator, and means responsive to deceleration rate and associated with said first switch means for overriding the actuation of said first switch means by said actuator when the vehicle is moving and decelerating at or above a selected rate.

4. A brake system for preventing movement of a vehicle when the vehicle engine is running comprising brake means operable to stop rotation of the vehicle wheels, means responsive to wheel movement and accelerator position for continually applying said brake means after the vehicle wheels are stopped while the accelerator is unactuated, said applying means being released by the actuation of said accelerator or by movement of the vehicle wheels, and deceleration responsive means responsive only to a deceleration rate greater than a predetermined rate for overriding said applying means and preventing continuing application of said brake means when said vehicle is moving with the wheels locked by said brake means and the accelerator unactuated, said deceleration responsive means comprising rigid inertia member associated with said applying means and pivotally mounted on said vehicle in position to sense deceleration of said vehicle, and spring means acting against said rigid inertia member in a direction to resist movement of the rigid inertia member upon deceleration of said vehicle, the weight of said rigid inertia member being selected to permit displacement of said rigid inertia member against said spring means during deceleration of said vehicle at above said predetermined rate, said applying means being overridden during displacement of said rigid inertia member.

5. A mechanism operative in response to movement of an element comprising a rotor positioned in a casing and connected with said movable element for rotation by said element over a wide range of speed, a plurality of vanes each slidably received in a radial groove in said rotor, a rotor ring extending around said rotor in said casing forming a fluid enclosure with said casing around said rotor and having fluid inlet means through said ring for admitting fluid into the space enclosed between said ring and said rotor, said ring being otherwise imperforate for preventing escape of fluid from said enclosure through said ring, said vanes moving outwardly against said ring upon rotation of said rotor to pump fluid into the enclosure space between the rotor and the ring, means for mounting said ring for bodily movement while preventing rotation of said ring so that said ring can be centered about said rotor by the pumped fluid, and means responsive to the centering movement of said ring to actuate said mechanism, said ring being positioned off-center of said rotor when said rotor is stationary.

6. A mechanism as defined in claim 5 having a clearance between the casing and the rotor and rotor ring for draining fluid out of the rotor ring enclosure so that the ring can return to its off-center position when the rotor is stationary and for transmitting fluid to the inner edge of said vanes to act with centrifugal force to hold the vanes against said rotor ring during rotation of the rotor.

7. A device for sensing movement of an element comprising a casing, rotatable means connected with said element and rotated thereby within said casing, vane means movably mounted on said rotatable means and extendable therefrom, means completely surrounding said vane means and said rotatable means forming with said casing a fluid enclosure and spaced from said rotatable means to permit extension of said vane means, means for continually biasing said surrounding means in one direction, said surrounding means having inlet means therethrough for allowing passage of fluid into the space within said enclosure between said rotatable means and said surrounding means, said surrounding means being otherwise imperforate for preventing escape of fluid from said enclosure through said surrounding means so as to move said surrounding means against said biasing means upon rotation of said rotatable means, means for slidably connecting said surrounding means to said casing to permit bodily movement of said surrounding means relative to said casing while restraining rotation of said surrounding means about its own axis, and means responsive to movement of said surrounding means for sensing movement of said element.

8. A device as defined in claim 7 wherein said connecting means comprises a slot in said casing and a pin extending from said surrounding means into said slot.

9. A device as defined in claim 7 having a clearance passage between said rotatable means and said casing for draining fluid confined between said surrounding means and said rotatable means through said inlet means when said rotatable means is stationary, the force of said biasing means acting to force confined fluid through said clearance passage and said inlet means when said rotatable means is stationary.

10. A device as defined in claim 9 wherein said vane means comprises a plurality of single vanes located in separate radial slots in said rotatable means, a space between the inner end of each vane and said rotatable means when said vanes are extended, each of said spaces being in communication with said clearance passage for receiving fluid therefrom to urge said vanes outwardly during rotation of said rotatable means.

11. A device for sensing movement of an element comprising a fluid-tight casing, a rotor within said casing connected with said element and rotatable by said element, a plurality of separate vanes slidably supported in separated slots in said rotor, each of said vanes being extendable from said rotor and separate from the other vanes, ring means surrounding said vanes and said rotor and having a diameter larger than said rotor to permit extension of said vanes and providing space between said rotor and a part at least of said ring means, biasing means acting against said ring means to hold said ring means in engagement with said rotor at one location when said rotor is stationary, means for slidably connecting said ring means to said casing to permit bodily movement of said ring means while restraining said ring means against rotation, passage means through said ring means allowing passage of fluid between said casing around said ring and said space between said rotor and said ring means, said ring means being imperforate other than for said passage means and with said casing defining said space between said ring means and said rotor sufficiently tight to trap fluid between each successive pair of vanes during rotation of said rotor by said element in order bodily to move said ring means relative to said rotor and against said biasing means, and means responsive to bodily movement of said ring means for sensing movement of said element.

12. A device for sensing movement of an element comprising rotatable means positioned in a casing and connected with said element for rotation thereby, a plurality of vane means movably mounted on said rotatable means and movable relative thereto upon rotation of said rotatable means, said vane means being spaced apart around said rotatable means, means surrounding said vane means and said rotatable means forming with said casing a fluid enclosure therearound while permitting said relative movement of said vane means and positioned eccentrically of said rotatable means when said element is stationary, said surrounding means having fluid passage means therethrough for allowing passage of fluid between space in said casing around said surrounding means and said fluid enclosure, said surrounding means being imperforate other than for said passage means and with said casing defining said fluid enclosure for confining fluid between said surrounding means and said rotatable means to trap fluid introduced between each successive pair of vane means during rotation of said rotatable means, the trapped fluid causing bodily movement of said surrounding means towards a concentric position with said rotatable means upon commencement of movement of said element, and means actuated by said movement of said surrounding means for sensing when said element is moving.

13. A device as defined in claim 12 having a clearance space between said casing and said rotatable means and between said casing and said surrounding means for draining fluid out of said surrounding means through said clearance space and said passage means when movement of said element ceases so that said surrounding means can return to its eccentric position.

14. A device as defined in claim 13 wherein said sensing means is located adjacent said surrounding means at a position opposite said passage means, and means for restraining said surrounding means against rotating movement while permitting bodily movement of said surrounding means relative to said sensing means.

(References on following page)

References Cited in the file of this patent

UNITED STATES PATENTS

| | | |
|---|---|---|
| 2,259,810 | Freeman | Oct. 21, 1941 |
| 2,287,562 | Pennington | June 23, 1942 |
| 2,317,982 | Diehl | May 4, 1943 |
| 2,577,680 | Harmon et al. | Dec. 4, 1951 |
| 2,592,247 | Doe | Apr. 8, 1952 |
| 2,630,195 | Weiss et al. | Mar. 3, 1953 |
| 2,681,713 | Chambers | June 22, 1954 |
| 2,685,842 | Hufferd | Aug. 10, 1954 |
| 2,731,526 | Teague et al. | Jan. 17, 1956 |
| 2,759,060 | Cloonan | Aug. 14, 1956 |
| 2,762,476 | Gaylord et al. | Sept. 11, 1956 |

FOREIGN PATENTS

| | | |
|---|---|---|
| 2,291 | Great Britain | 1910 |